Patented July 16, 1940

2,207,727

UNITED STATES PATENT OFFICE 2,207,727

NITRO-TERTIARY-ALKYL-PHENOLS

Cecil M. Galloway, Midland, Mich., assignor to The Dow Chemical Company, Midland, Mich., a corporation of Michigan No Drawing. Application January 20, 1939, Serial No. 251,913

4 Claims. (Cl. 260—622)

The present invention concerns a new class of compounds, namely, the 2-nitro-4-tertiary-alkyl-phenols. I have prepared certain of these compounds, determined physical properties thereof whereby they may be readily identified, and found that they are particularly useful as intermediates in the manufacture of amine derivatives useful as gasoline anti-oxidants. The invention, then, consists in the new products hereinafter fully described and particularly pointed out in the claims.

According to the invention, a solution of a 4-tertiary-alkyl-phenol in a suitable organic solvent, e. g. benzene or acetic acid, is reacted with dilute nitric acid at such a temperature as favors the introduction of a single nitro group into the benzene nucleus. The reaction is carried out by mixing the tertiary-alkyl-phenol and nitric acid solutions together at such a rate and with such cooling of the reaction mixture as maintains the temperature of the mixture below 20° C., and preferably between 0° and 15° C. Agitation is maintained throughout the early stages of the reaction and thereafter for a period sufficient to insure a completion of the nitration. The mixture is then diluted with an excess of water and the oily layer separated as by decantation or extraction. This oily layer, containing a mixture of mono- and di-nitro-tertiary-alkyl-phenols, is thereafter washed with water to remove traces of nitric acid and the desired mono-nitro-compound separated. This purification may be accomplished either by fractional distillation under reduced pressure or by fractional crystallization of the alkali metal salts of the phenols. The preferred method is dependent upon the stability and boiling points of the particular compounds concerned.

My new compounds may also be obtained by reacting a 4-tertiary-alkyl-2-nitro-halobenzene with aqueous alkali under pressure and in the presence of copper catalyst to obtain the corresponding alkali metal phenolate. The free phenol is readily obtained from such a reaction product by acidification and subsequent purification as described above.

The following illustrative examples describe in detail the preparation of certain specific members of my new class of compounds, but are not to be construed as limiting the same:

Example 1

150 grams (1 mol) of 4-tertiary-butyl-phenol was dissolved in 300 milliliters of benzene. This solution was cooled to a temperature of 10°–15° C. and a mixture of 256 milliliters of water and 128 milliliters of 70 per cent nitric acid added portion-wise thereto over a period of three hours with stirring and at temperatures ranging between 10° and 15° C. After all of the acid had been added, agitation of the mixture was continued for one-half hour. The reaction mixture was then diluted with an excess of water and the benzene layer separated off and evaporated down to obtain a residue of a crude 2-nitro-4-tertiary-butyl-phenol product. This residue was fractionally distilled, whereby there was obtained 127 grams of 2-nitro-4-tertiary-butyl-phenol as a yellow oil boiling at 136° to 138° C. at 15 to 16 millimeters pressure. Upon analysis, this product was found to contain 7.41 per cent by weight of nitrogen as compared to a theoretical nitrogen content of 7.71 per cent.

Example 2

A solution of 197 grams (1.2 mols) of 4-tertiary-amyl-phenol in 550 milliliters of benzene was added drop-wise with stirring to 113.4 grams (1.26 mols) of 70 per cent nitric acid dissolved in 113 milliliters of water. The temperature of the reaction mixture was held at 0° to 8° C. by external cooling throughout the addition, which was completed in 1.5 hours. The reaction mixture was then stirred for an additional 30 minutes and thereafter diluted with 250 milliliters of water. The benzene layer was separated by decantation, washed with 250 milliliters of water, and fractionally distilled, whereby there was obtained 208.5 grams of 2-nitro-4-tertiary-amyl-phenol as a yellow oil having the specific gravity 1.12 at 25°/25° C., and boiling at 160.6° C. at 20 millimeters and 185.4° C. at 50 millimeters pressure. The nitrogen content of this compound was found, on analysis, to be 6.94 per cent by weight as compared to a theoretical of 6.7 per cent.

In a similar manner, other 2-nitro-4-tertiary-alkyl-phenols may be prepared. For example, by starting with 4-tertiary-alkyl-phenols, in which the alkyl group contains from 6 to 18 carbon atoms, such compounds as 2-nitro-4-tertiary-hexyl-phenol, 2-nitro-4-tertiary-decyl-phenol, 2-nitro-4-tertiary-dodecyl-phenol, 2-nitro-4-tertiary-octadecyl-phenol, and the like may be obtained.

While this invention includes within its scope all 2-nitro-4-tertiary-alkyl phenols wherein the alkyl group contains between 4 and 18 carbon atoms, the preferred embodiment of the invention resides in those compounds having the formula

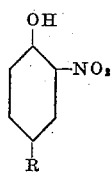

wherein R represents a tertiary-alkyl group containing not more than 6 carbon atoms. These compounds are characterized by sufficiently low boiling points as permit their purification by fractional distillation, and also have the property of being readily reduced to yield the corresponding 4-tertiary-alkyl-ortho-amino-phenols.

Other modes of applying the principle of my invention may be employed instead of those explained, change being made as regards the materials employed, provided the products described in the following claims be thereby obtained.

I therefore particularly point out and distinctly claim as my invention:

1. A mono-nitro-mono-tertiary-alkyl-phenol wherein the nitro group is in the 2-position and the tertiary-alkyl group is in the 4-position on the benzene ring with respect to the hydroxyl.

2. A compound having the formula

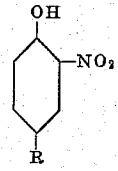

wherein R represents a tertiary-alkyl group containing not more than 6 carbon atoms.

3. 2-nitro-4-tertiary-butyl-phenol.
4. 2-nitro-4-tertiary amyl-phenol.

CECIL M. GALLOWAY.